July 25, 1961 R. WELLS 2,993,268

PROCESS FOR MAKING A MOLD

Original Filed Jan. 28, 1958

INVENTOR
Roger Wells,
INVENTOR.
BY
Karl W. Flocks
ATTORNEY

United States Patent Office 2,993,268
Patented July 25, 1961

2,993,268
PROCESS FOR MAKING A MOLD
Roger Wells, Stamford, Conn., assignor to Diamond National Corporation, a corporation of Delaware
Original application Jan. 28, 1958, Ser. No. 711,612, now Patent No. 2,923,353, dated Feb. 2, 1960. Divided and this application Aug. 11, 1959, Ser. No. 832,889
2 Claims. (Cl. 29—421)

The present invention relates to a process for making a mold, and more particularly to a method in which two metal plates of varying ductility are welded together at spaced areas and separated by fluid pressure in the unwelded areas.

This application is a division of Roger Wells' application, Serial No. 711,612, filed January 28, 1958, now Patent No. 2,923,353.

In machines for making articles of molded pulp, a mold is provided which is immersed in a pulp slurry, and by means of vacuum drawing through the mold a layer of pulp fibers from the slurry is caused to adhere to the mold. The molds heretofore used have generally been of a type in which the mold is cast in a prepared form, and then is drilled through in order to provide for the necessary suction. Such molds have been expensive and laborious, as well as time consuming, to make. In addition, such molds have been relatively heavy, thus adding to the weight and bulkiness of the parts of the machine which support the mold.

Other molds are known which are made of two plates of the proper shape secured together at their peripheries, the molding plate being penetrated with numerous holes for the necessary suction. Such construction, although it solves the problem of lightness, has not been completely satisfactory because of the weakness inherent in the construction.

An object of the present invention is to provide a process for making a mold for a pulp molding machine which process is more economical than those presently used.

An object of the present invention is the provision of a method of making a mold of metal sandwich construction.

Other objects and the nature and advantages of the instant invention will be apparent from the following description taken in conjunction with the accompanying drawings wherein.

Figure 1:
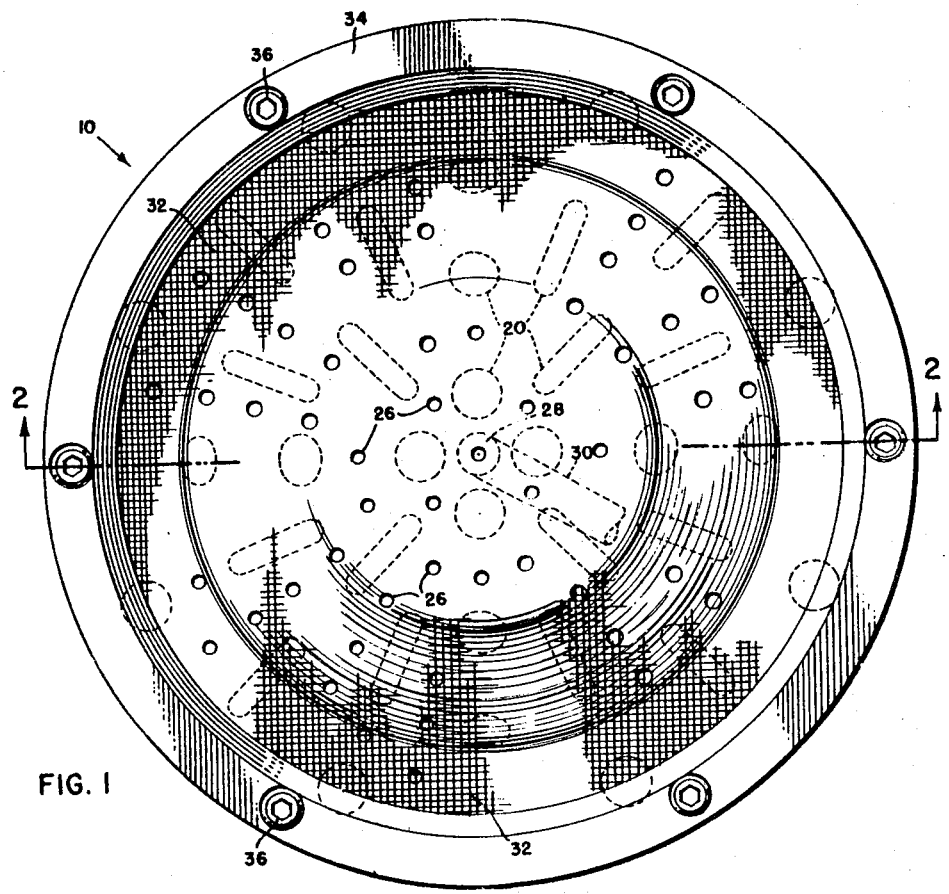
FIG. 1 is a plan view of a mold in accordance with the process of the present invention.
Figure 2:
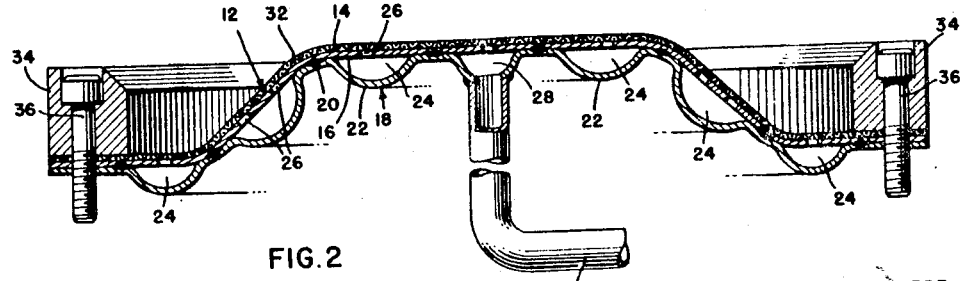
FIG. 2 is a cross-sectional view taken on the line 2—2 of FIG. 1.

Referring now to the drawings, wherein like reference characters are used to designate like or corresponding parts through the several views, there is shown in FIG. 1 a mold 10. As shown in FIG. 2, the mold 10 has a first plate 12 having a molding face 14 and a back face 16. Plate 12 is shaped to any desired configuration, as dictated by the shape of the article which it is desired to mold. Underlying plate 12 is a second plate 18, plate 18 having spaced non-contiguous areas 20 welded to the back face 16 of the plate 12. The welded areas 20 may be of any desired shape, such as circular or oblong. The areas of plate 18 which are not welded to plate 12 are separated therefrom, as at 22 to provide a cavity 24 which extends completely beneath the plate 12.

Numerous holes 26 penetrate the plate 12 into the cavity 24, and a single aperture 28 is in the plate 18 to accommodate a conduit 30.

Overlying the molding face 14 of plate 12, and in contact therewith is a screen 32, shown broken away in FIG. 1. Screen 32 is secured to the plates 12 and 18 by a block 34 which extends peripherally about the plates and overlies the screen 32. Suitable securing means, such as the screws 36, serve to hold the block 34 to the plates 12 and 18. Block 34 also serves to better define the mold area, to yield an article having a well defined edge.

It will be apparent that the mold described herein operates in the conventional manner; when the mold is immersed in the pulp slurry, vacuum applied through the conduit 30 will reduce the pressure in cavity 24 and suck air and moisture through the holes 26. It will be understood that the plates 12 and 18 are held together at the welded areas 20, and that they are preferably welded at their peripheries. The block 34 serves to hold the screen 32 to the molding face 14 of the plate 12.

It will be readily apparent that the spaced, welded areas 20 extending over the entire surface of the mold result in a mold which has great strength and which will not deform in use, as when vacuum is applied thereto.

The method of making the mold shown in the drawings will now be described. The plate 10 is of non-ductile material, and is shaped by known means, such as by drawing between dies or stamping. Plate 18 is similarly formed, but is of a relatively ductile material. The plates 12 and 18 are placed together and welded at spaced areas 20. They may also be welded or otherwise secured at their peripheries, it being understood that a suitable opening is made either through the plate 18 into the unwelded area 22, or between the two plates 12 and 18 at their peripheries. Fluid under pressure, such as an hydraulic oil, is then forced between the plates 12 and 18, causing the ductile plate 18 to expand at the unwelded areas 22, thus resulting in the continuous cavity 24. Thereafter, the holes 26 and aperture 28 may be provided, as by drilling or, alternatively, the aperture 28 may have already been drilled for the purpose of permitting introducion of the fluid under pressure. Screen 32 is then placed on the molding face 14 of plate 12 and secured to the plates 12 and 18 by the block 34 and screws 36.

Where words such as "overlying" and "underlying" have been used throughout the specification, it will be understood that such words are descriptive only, and are not intended as words of limitation.

It will be obvious to those skilled in the art that various changes may be made without departing from the spirit of the invention and therefore the invention is not limited to what is shown in the drawings and described in the specification but only as indicated in the appended claims.

What is claimed is:

1. A process for making a mold comprising shaping a first plate of relatively non-ductile material to a three-dimensional configuration, shaping a second plate of relatively ductile material to said configuration, making an aperture in said second plate, welding said plates together at spaced areas and at their peripheries, introducing fluid between said plates to thereby expand the unwelded areas of said second plate away from said first plate, and drilling a large number of small diameter holes through said first plate subsequent to the introduction of fluid between said plates.

2. A process for making a mold comprising shaping a first plate of relatively non-ductile material to a three-dimensional configuration, shaping a second plate of relatively ductile material to said configuration, welding said plates together at spaced areas and their peripheries, introducing fluid between said plates to expand the unwelded areas of said second plate away from said first plate, and drilling holes through the unwelded areas of said first plate.

References Cited in the file of this patent

UNITED STATES PATENTS

| | | |
|---|---|---|
| 555,932 | Curtis | Mar. 10, 1886 |
| 1,709,865 | Muffly | Apr. 23, 1929 |
| 2,353,466 | Heintz | July 11, 1944 |
| 2,393,697 | Lornitzo | Jan. 29, 1946 |
| 2,537,746 | Davis | Jan. 9, 1951 |
| 2,582,358 | Schoellerman | Jan. 15, 1952 |